United States Patent
Madinabeitia et al.

(10) Patent No.: US 9,748,754 B2
(45) Date of Patent: *Aug. 29, 2017

(54) CONNECTOR PLUG HAVING A SEALING HOOK WITH A BEVEL SURFACE AND FLEXIBLE RIDGES

(71) Applicant: TECHNOLOGIES HOLDINGS CORP., Houston, TX (US)

(72) Inventors: Rafael Antonio Fematt Madinabeitia, Sugar Land, TX (US); Jorge L. Mireles Jasso, Coahuila (MX)

(73) Assignee: Technologies Holdings Corp., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,182

(22) Filed: Jul. 13, 2016

(65) Prior Publication Data

US 2016/0322801 A1 Nov. 3, 2016

Related U.S. Application Data

(63) Continuation of application No. 14/657,326, filed on Mar. 13, 2015, now Pat. No. 9,450,327.

(51) Int. Cl.
| | |
|---|---|
| H01R 13/52 | (2006.01) |
| H02G 15/013 | (2006.01) |
| H01R 13/502 | (2006.01) |
| H01R 25/00 | (2006.01) |
| H02G 3/08 | (2006.01) |
| H02G 15/007 | (2006.01) |

(52) U.S. Cl.
CPC ......... *H02G 15/013* (2013.01); *H01R 13/502* (2013.01); *H01R 13/5205* (2013.01); *H01R 25/00* (2013.01); *H02G 3/083* (2013.01); *H02G 15/007* (2013.01); *H01R 13/5208* (2013.01)

(58) Field of Classification Search
CPC  H01R 13/506; H01R 13/516; H01R 13/5213; H01R 13/56; H01R 13/562; H01R 13/58; H01R 13/5845; H01R 13/52
USPC .................. 439/271–275, 445, 447, 465
See application file for complete search history.

(56) References Cited

U.S. PATENT DOCUMENTS

| | | | |
|---|---|---|---|
| 5,118,057 A | 6/1992 | Martin et al. | |
| 5,927,725 A * | 7/1999 | Tabata | H01R 13/5205 174/152 G |
| 6,045,383 A | 4/2000 | Fujiwara | |
| 6,051,794 A | 4/2000 | Katou et al. | |
| 6,338,651 B1 | 1/2002 | Svette | |
| 6,416,351 B1 * | 7/2002 | Ho | F21V 27/02 439/447 |
| 6,492,590 B1 | 12/2002 | Cheng | |
| 6,499,621 B1 | 12/2002 | Yamaguchi et al. | |
| 6,743,981 B2 | 6/2004 | Miyakoshi | |
| 6,764,329 B2 | 7/2004 | Noguchi | |

(Continued)

*Primary Examiner* — Chandrika Prasad
(74) *Attorney, Agent, or Firm* — Baker Botts L.L.P.

(57) ABSTRACT

A connector plug comprises a hook with flexible edges. The hook has a first beveled surface and a second flat surface. A stopper is coupled to the flat surface of the hook by a first barrel portion of the connector plug. The stopper is coupled to a plurality of ridges with flexible edges by a second barrel portion. The plurality of ridges are also coupled to each other by the second barrel portion. A via extends through the connector plug from one end of the connector plug to the other end of the connector plug.

13 Claims, 4 Drawing Sheets

(56) References Cited

U.S. PATENT DOCUMENTS

| | | | |
|---|---|---|---|
| 6,768,054 B2 * | 7/2004 | Sato | H02G 3/088 |
| | | | 174/50 |
| 7,077,281 B2 | 7/2006 | Sato et al. | |
| 7,288,000 B2 * | 10/2007 | Liu | H01R 13/5845 |
| | | | 439/447 |
| 7,355,130 B2 | 4/2008 | Holman et al. | |
| 7,614,915 B2 | 11/2009 | Kamenoue et al. | |
| 7,762,415 B2 | 7/2010 | Matsui | |
| 7,781,684 B2 | 8/2010 | Stuckmann et al. | |
| 8,033,408 B2 | 10/2011 | Makela et al. | |
| 8,633,383 B2 * | 1/2014 | Akahori | H01R 9/2458 |
| | | | 174/50 |
| 8,692,122 B2 | 4/2014 | Suzuki | |
| 2002/0115345 A1 | 8/2002 | Nakamura | |
| 2010/0075523 A1 | 3/2010 | Saitou | |
| 2010/0255703 A1 | 10/2010 | Yoshioka | |
| 2013/0026161 A1 * | 1/2013 | I | H02G 3/088 |
| | | | 220/3.8 |
| 2014/0252722 A1 | 9/2014 | Takao et al. | |

* cited by examiner

CONNECTOR PLUG HAVING A SEALING HOOK WITH A BEVEL SURFACE AND FLEXIBLE RIDGES

CROSS REFERENCE TO RELATED APPLICATIONS

This application is a continuation of U.S. patent application Ser. No. 14/657,326 entitled "Connection Plug for a Housing," which was filed on Mar. 13, 2015, which is hereby incorporated by reference.

TECHNICAL FIELD

This disclosure relates generally to mechanical devices and specifically to a connector plug for a housing.

BACKGROUND OF THE INVENTION

Electrical and mechanical devices often need to be placed in hard to reach locations where they may be exposed to adverse weather conditions, moisture, contaminants, or other foreign objects that could damage them. It is thus desirable to keep these devices protected while at the same time accessible and easy to maintain. Current approaches to solving this problem are ineffective and generally difficult to use.

SUMMARY OF THE INVENTION

According to embodiments of the present disclosure, disadvantages and problems associated with previous devices may be reduced or eliminated.

In one embodiment, a connector plug comprises a hook with flexible edges. The hook has a first beveled surface and a second flat surface. A stopper is coupled to the flat surface of the hook by a first barrel portion of the connector plug. The stopper is coupled to a plurality of ridges with flexible edges by a second barrel portion. The plurality of ridges are also coupled to each other by the second barrel portion. A via extends through the connector plug from one end of the connector plug to the other end of the connector plug.

Certain embodiments of the present disclosure may provide one or more advantages. One advantage of one embodiment may include the ability to couple the connector plug to a housing to create a watertight seal. Another advantage may include the ability to couple or decouple a cable to an electrical or mechanical component in a housing without disassembling or reassembling the housing. This may allow a maintenance person to easily access and service electrical or mechanical components even when they are placed in difficult to reach locations.

Various embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE DRAWINGS

Figure 1:
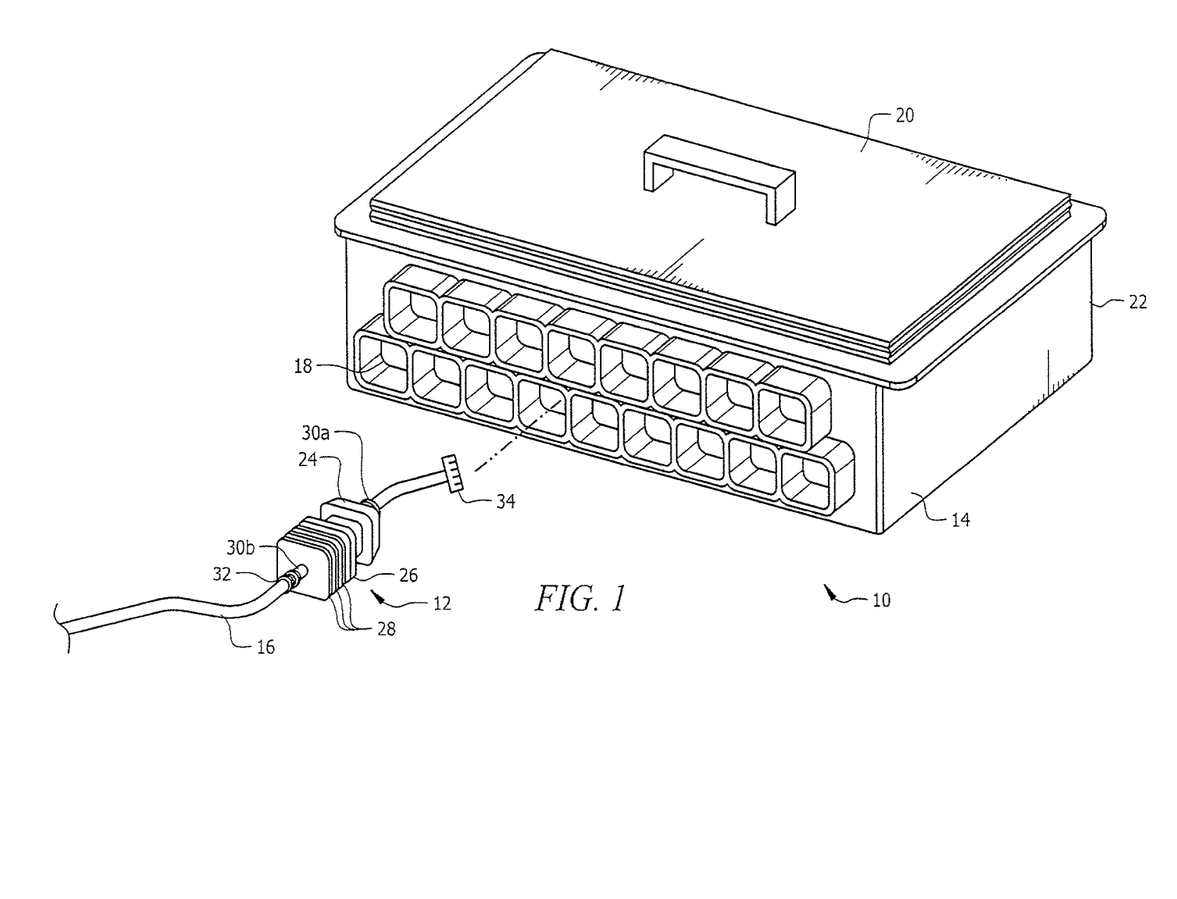
FIG. 1 illustrates a perspective view of a housing and a connector plug coupled to a cable according to one embodiment.

FIG. 1 illustrates a system 10 comprising a connector plug 12 and a housing 14 according to certain embodiments of the present disclosure. Housing 14 comprises a body portion 22 having multiple openings 18 formed therein. Housing 14 may further comprise a top portion 20, such as a lid, that encloses housing 14. Connector plug 12 may be removably coupled to housing 14 by inserting connector plug 12 into an opening 18 of the housing 14 while housing 14 remains intact. In other words, connector plug 12 may be inserted into opening 18 while top portion 20 is closed, the opening 18 remains intact, or top portion 20 and body portion 22 of housing 14 otherwise remain attached to each other to form an enclosure. Connector plug 12 may also be removed from opening 18 of housing 14 while housing 14 remains intact. In other words, connector plug 12 can be removed from opening 18 of housing 14 while top portion 20 is closed, the opening 18 remains intact, or top portion 20 and body portion 22 of housing 14 otherwise remain attached to each other to form an enclosure.

In a particular embodiment of system 10, a cable 16 runs through connector plug 12 and is coupled to a cable connector 34 for connection to a component enclosed within housing 14. In this embodiment, cable connector 34 and a portion of cable 16 may be inserted into housing 14 through an opening 18. Connector plug 12 may then be inserted into opening 18. All of this may be done while top portion 20 is coupled to body portion 22 and/or while opening 18 remains intact. Similarly, connector plug 12, cable 16, and cable connector 34 may all be removed from housing 14 through an opening 18 by pulling on cable 16 while top portion 20 is coupled to body portion 22 and/or while opening 18 remains intact, thereby leaving housing 14 intact. In this way, a cable connector 34 coupled at one end of cable 16 may be coupled to a component in housing 14 using connector plug 12 without disassembling or reassembling portions of housing 14. This allows a maintenance person to easily access and service system 10 even when placed in difficult to reach locations.

Connector plug 12 may be made of any material including any combination of flexible, malleable, rigid, or any other types of materials. Different portions of connector plug 12 may be made of different materials. In one embodiment, connector plug 12 may be made of a flexible polymer. As discussed in greater detail with respect to FIG. 2 below, connector plug 12 may comprise a hook 24, a stopper 26, ridges 28, necks 30a and 30b, and a via 32. Necks 30a and 30b may form the ends of connector plug 12.

Housing 14 may be any support structure that can house any mechanical or electrical device or component. For example, in one embodiment, housing 14 contains a printed circuit board or other electro or electro-mechanical component to which cable connector 34 connects for operation. Housing 14 may be formed of any combination of materials. Different portions of housing 14 may be made of different materials. In one embodiment, housing 14 is made of a rigid polymer. Housing 14 may have a top portion 20 and a body portion 22. Top portion 20 may be removably coupled or permanently attached to body portion 22. In other embodiments, housing 14 may only have a body portion 22 and one portion of housing 14 remains exposed. Body portion 22 includes one or more openings 18, as discussed in greater detail below with respect to FIG. 3. Although housing 14 is illustrated as a rectangular box, it may take any suitable shape according to particular needs.

Cable 16 may be any flexible, malleable, rigid or any other type of wire. In one embodiment, cable 16 may contain one or more conductive wires surrounded by one or more insulated portions. Cable 16 may carry electrical signals, optical signals, digital signals, analog signals, audio signals or any other type of signals. Cable 16 may be coupled to any mechanical, electrical, or electro-mechanical component stored within housing 14. In some embodiments, cable 16 may be replaced by any other object that can be inserted into connector plug 12. For example, cable 16 may be replaced by a stopper for sealing at least one end of connector plug 12.

Cable connector 34 may be any electro, electro-mechanical, optical, or other type of interface device for coupling a cable 16 to an electrical, electro-mechanical, optical, or other interface component. In the embodiment where cable 16 contains one or more conductive wires, cable connector 34 may be coupled to one or more of those conductive wires.

In operation of one embodiment of the present disclosure, cable 16 is inserted into connector plug 12 through via 32. Cable 16 runs through the entire length of connector plug 12 going in one end and out the other end. Thus, cable 16 is inserted into connector plug 12 through neck 30*a* and emerges from connector plug 12 through neck 30*b*. Once cable 16 is threaded through via 32 of connector plug 12, a cable connector 34 may be connected to cable 16 at one end. With cable 16 running through it, connector plug 12 may be removably coupled to housing 14 by inserting connector plug 12 into an opening 18 of housing 14. This may be accomplished by pushing neck 30*a* and hook 24 of connector plug 12 through opening 18. Hook 24 may then latch onto housing 14 and the other portions of connector plug 12 may reside inside opening 18, as described in greater detail with respect to FIG. 4 below. In this manner, one portion of cable 16 may be positioned inside housing 14 and a different portion of cable 16 may be positioned outside housing 14. The opening 18 of housing 14 remains intact when connector plug 12 is inserted into it. In other words, the opening 18 does not need to be disassembled in order to receive connector plug 12, nor does opening 18 need to be reassembled in order to hold connector plug 12 upon insertion.

In one embodiment, connector plug 12 inserted into opening 18 of housing 14 creates a watertight seal such that liquids outside housing 14 do not easily enter housing 14 through opening 18. As connector plug 12 generally carries a cable 16 for connection to an electrical, mechanical, electro-mechanical, optical or other type of component stored within housing 14, such a watertight seal created by connector plug 12 serves to protect the component stored in housing 14. To remove connector plug 12 from housing 14, a user may pull on the portion of cable 16 that is positioned outside housing 14 by applying force in a direction away from housing 14. By so doing, a user may dislodge hook 24 from housing 14 and remove connector plug 12, along with cable 16, from opening 18. In one embodiment, the cable connector 34 is disconnected from the component in housing 14 before the connector plug 12 is removed. In addition, when connector plug 12 is removed, the opening 18 need not be disassembled to release connector plug 12. In this way, opening 18 remains intact when connector plug 12 is inserted into it and when connector plug 12 is removed from it.

This embodiment also allows a user to couple and decouple a connector plug 12 to a housing 14 while housing 14 remains intact, such as, for example, without disassembling housing 14 or removing top portion 20 of housing 14. In certain situations when housing 14 is placed in a hard to reach location, for example, the ability for a user to remove connector plug 12 from housing 14 without disassembling housing 14 provides advantages. For example, if any portion of a cable 16 (or cable connector 34) becomes faulty, a serviceman can easily remove the corresponding connector plug 12 from housing 14 and simply replace it with a new cable 16 that runs through a different connector plug 12 which can be inserted into opening 18 such that the cable 16 can be connected to the component stored within housing 14.

This embodiment further allows an operator to insert cable 16 that is coupled to cable connector 34 into housing 14 while top portion 20 and body portion 22 are attached and housing 14 remains intact. Here, openings 18 may be large enough that cable connector 34 coupled to cable 16 may fit through an opening 18. Thus, an operator may first couple cable 16 to connector plug 12 and then couple one end of cable 16 to cable connector 34. The operator may then insert cable connector 34 and a portion of cable 16 through opening 18 into housing 14. Connector plug 12 may then fit into opening 18 as described in greater detail with respect to FIG. 4 below. In this manner, the operator may not need to couple cable 16 to cable connector 34 inside housing 14 which may be difficult to do, particularly when housing 14 is placed in a location that is confined or difficult to access. In this manner, when necessary, the operator may simply couple cable connector 34, which may already be coupled to cable 16, to the component housed within housing 14. Similarly, to remove or repair cable 16 or cable connector 34, an operator may remove connector plug 12 and cable 16 coupled to cable connector 34 through an opening 18 by pulling on a portion of cable 16 that is outside housing 14 without removing or otherwise manipulating top portion 20. This embodiment may simplify repairing and replacing cable 16 and cable connector 34 by allowing a user to couple cable 16 to a cable connector 34 away from housing 14.

Figure 2:
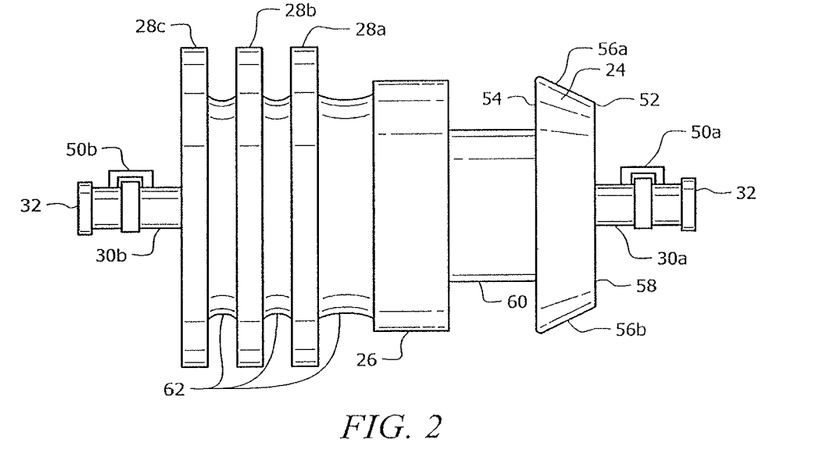
FIG. 2 illustrates a detailed view of the connector plug.

FIG. 2 illustrates a connector plug 12 according to one embodiment of the present disclosure. In this embodiment, connector plug 12 comprises a hook 24, a stopper 26, ridges 28*a*, 28*b*, and 28*c*, necks 30*a* and 30*b*, and via 32. Fasteners 50*a* and 50*b* are coupled to necks 30*a* and 30*b* in order to clamp the necks 30*a* and 30*b* around cable 16 that runs through connector plug 12.

Hook 24 may be made of any suitable material such as, for example, a flexible polymer. Hook 24 may have a beveled surface 52 and a flat surface 54. In one embodiment, hook 24 may have flexible edges. Hook 24 may be substantially rectangular and may have rounded or pointed corners. In such an embodiment, flat surface 54 may be substantially rectangular and may have a length and a width. The length and the width of flat surface 54 may be substantially equal or different. In other embodiments, hook 24 may be substantially circular or elliptical and may have any suitable cross sectional dimensions. In those embodiments, flat surface 54 may not have any corners. A neck 30*a* may be coupled to hook 24 at one end of connector plug 12. Flat surface 54 may be made of or be coated with an adhesive and/or water sealing material. Beveled surface 52 of hook 24 may also be made of any suitable material which may be different from the material of flat surface 54.

Beveled surface 52 may contain beveled edges 56*a* and 56*b* and a beveled surface face 58. Beveled edges 56*a* and 56b may make it easy to bend the flexible edges of hook 24 in one direction but keep the edges of hook 24 from bending in the other direction, as discussed in greater detail with respect to FIG. 4 below. Although only two beveled edges 56a and 56b are illustrated in FIG. 2, it will be understood that all, some, or none of the edges of the beveled surface 52 may be beveled. Beveled surface face 58 and flat surface 54 may be substantially parallel to each other. Beveled surface face 58 may be of a different shape than flat surface 54. Beveled edges 56a and 56b may connect flat surface 54 to beveled surface face 58. Beveled edges 56a and 56b may be angled so that they are not perpendicular to either flat surface 54 or beveled surface face 58. In other embodiments, beveled surface 52 may be substantially conical and may not have a beveled surface face 58.

Stopper 26 is coupled to flat surface 54 of hook 24 by a first barrel portion 60. Stopper 26 may be made of any suitable material such as, for example, a flexible polymer. In one embodiment, stopper 26 may have flexible edges. Stopper 26 may be of any shape including a substantially rectangular shape, a substantially circular shape, a substantially elliptical shape or any other suitable shape. In the embodiment where stopper 26 is substantially rectangular, stopper 26 may have a length and a width. In such an embodiment, stopper 26 may have rounded or pointed corners. In various embodiments, stopper 26 may be smaller, larger, or the same size as hook 24. In one embodiment, one side of stopper 26 may be adhesive and/or water sealing.

Ridges 28a-c are coupled to each other and to stopper 26 of connector plug 12 by a second barrel portion 62. Neck 30b couples to ridge 28c at one end of connector plug 12. Ridges 28a-c may extend beyond second barrel portion 62 in a substantially linear manner as illustrated in FIG. 2. Although only three ridges 28a-c are illustrated in FIG. 2, it will be understood that connector plug 12 may have any suitable number of ridges 28. In one embodiment, one or more ridges 28a-c may have flexible edges. Ridges 28a-c may be made of any suitable material such as, for example, a flexible polymer. Ridges 28a-c may be of any shape including a substantially rectangular shape, a substantially circular shape, a substantially elliptical shape or any other suitable shape. In the embodiment where ridges 28a-c are substantially rectangular, ridges 28a-c may have lengths and widths. Additionally, ridges 28a-c may have rounded or pointed corners. In various embodiments, ridges 28a-c may be smaller, larger, or the same size as stopper 26 or hook 24.

Necks 30a and 30b may form the two ends of connector plug 12. Neck 30a may be connected to beveled surface 52 of hook 24, such as on beveled surface face 58. Here, neck 30a forms a first end of connector plug 12 and a first end of via 32 terminates at neck 30a. Neck 30b may be connected to ridge 28c. Here, neck 30b forms a second end of connector plug 12 and a second end of via 32 terminates at neck 30b. Necks 30a and 30b may be of any dimension suitable to support a cable 16 that runs through via 32. In some embodiments, connector plug 12 may only have neck 30a or 30b or may not have a neck 30. In the embodiment where connector plug 12 only has one neck 30a, via 32 may terminate at neck 30a and at ridge 28c. In the embodiment where connector plug 12 only has one neck 30b, via 32 may terminate at hook 24 and at neck 30b. And in embodiments where connector plug 12 has no necks, via 32 may terminate at hook 24 and at ridge 28c. In all such embodiments, via 32 may extend from one end to the other end of connector plug 12. In the embodiment where connector plug 12 has one or more necks 30, necks 30 may be long enough to support fasteners 50a and 50b, as discussed in greater detail below.

Fasteners 50a and 50b may include cable ties, zip ties, clamps, wires, or any other suitable fastening device. Fasteners 50a and 50b tighten necks 30a and 30b around a cable 16 that runs through via 32. For example, because via 32 may be slightly larger than cable 16 running through it, fasteners 50a and 50b may minimize or eliminate any space between cable 16 and necks 30a and 30b. Minimizing this space may reduce or eliminate fluids entering into via 32.

Figure 3:
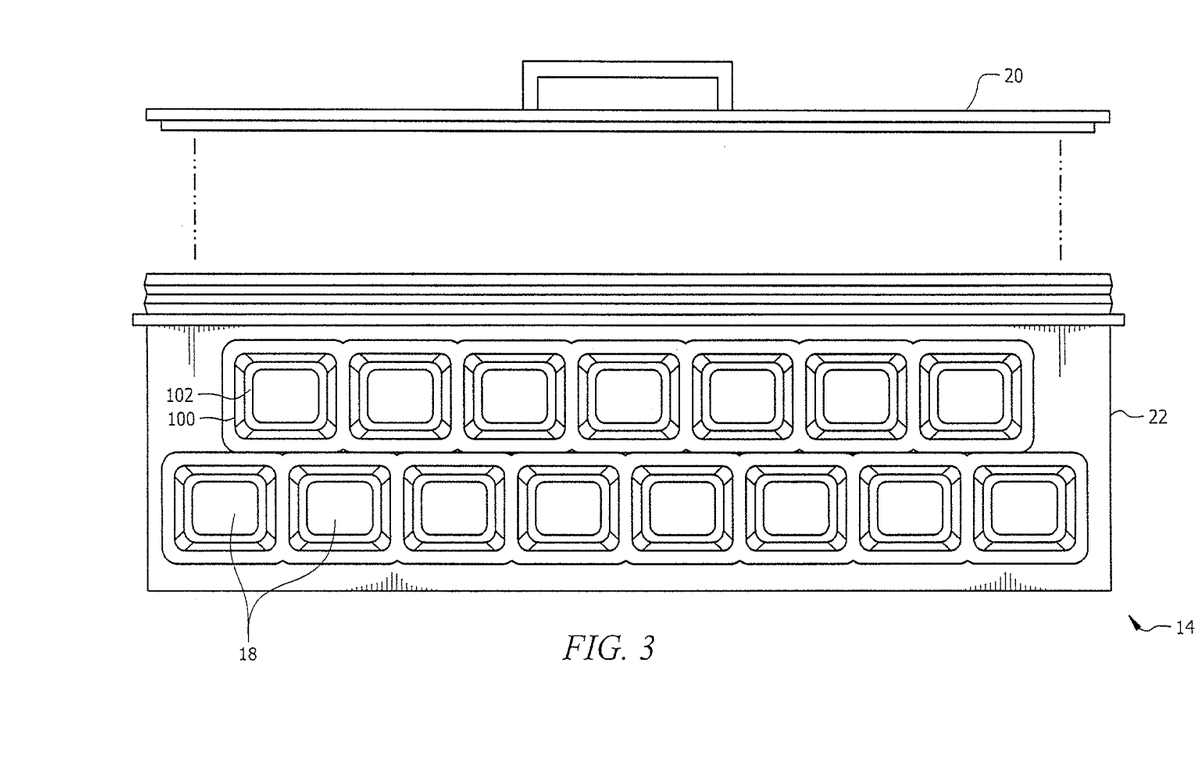
FIG. 3 illustrates a detailed view of the housing.

FIG. 3 illustrates a housing 14 according to one embodiment of the present disclosure. In this embodiment, housing 14 has a top portion 20 and a body portion 22 having a plurality of openings 18 formed therein.

Body portion 22 of housing 14 may be made of any suitable material such as, for example, a rigid polymer. In one embodiment, body portion 22 may form five sides of a rectangular box. In other embodiments, body portion 22 may be of any other shape and may form any suitable portion of that shape. For instance, in one embodiment, housing 14 may be cylindrical and body portion 22 may form all but the top surface of the cylinder.

Top portion 20 may be a lid, a cover, a cap or any other suitable component that attaches to body portion 22 to form an enclosed housing 14. In one embodiment, top portion 20 may be removably coupled to body portion 22. In embodiments where body portion 22 of housing 14 forms five sides of a rectangular box, top portion 20 may form a sixth side to complete the box. In other embodiments where body portion 22 is not shaped as a rectangular box, top portion 20 may be any portion of housing 14 that encloses housing 14. In some embodiments, housing 14 may not have a top portion 20. In such embodiments, body portion 22 may form the entirety of housing 14. Top portion 20 may be made of any material including material that is different from body portion 22.

Body portion 22 may have any number of openings 18 formed therein. Openings 18 may be formed in body portion 22 in a variety of ways. For example, in one embodiment, openings 18 may be partially formed by body portion 22 and partially formed by top portion 20 so that openings 18 are formed by attaching top portion 20 to body portion 22. In another embodiment, openings 18 may be formed entirely within body portion 22 so that removing or attaching top portion 20 does not affect or deform openings 18. For example, openings 18 may be defined by body portion 22 but not by top portion 20. As illustrated in FIG. 2, a portion of body portion 22 may separate openings 18 from top portion 20.

Openings 18 may extend from a first end, such as at an outer surface of the housing 14, to a second end, such as at an inner surface of the housing 14. Openings 18 may be of any suitable size and may be large enough to insert cable connector 34 coupled to cable 16. The first end of an opening 18 corresponds to an outer frame 100. Outer frame 100 has any suitable size including a size that is smaller than or the same size as ridges 28 of connector plug 12. For example, in the embodiment where outer frame 100 is smaller than ridges 28, outer frame 100 may have a dimension that is smaller than a corresponding dimension of the plurality of connector plug ridges 28. The second end of opening 18 corresponds to an inner frame 102. Inner frame 102 has any suitable size including a size that is smaller than, larger than, or the same size as hook 24 of connector plug 12. For example, in the embodiment where inner frame 102 is smaller than hook 24, inner frame 102 may have a dimension that is smaller than a corresponding dimension of hook 24.

Outer frame 100 may be larger, smaller, or the same size as inner frame 102. Outer frame 100 and/or inner frame 102 may define an opening 18 that has a circular, elliptical, cubic, rectangular or any other suitable shape with any suitable dimensions. The shape of opening 18 generally corresponds with the shape of connector plug 12 such that when connector plug 12 is inserted into opening 18, it can create a watertight seal. For example, if opening 18 is circular, then connector plug 12 is also circular with circular ridges 28a-c and a circular hook 24. If opening 18 is rectangular, then connector plug 12 is also rectangular with rectangular ridges 28a-c and a rectangular hook 24.

In general, housing 14 stores any suitable electrical, mechanical, electro-mechanical, optical, or any other suitable type of component to which cable connector 34 may be coupled when inserted through opening 18 using connector plug 12.

Figure 4:
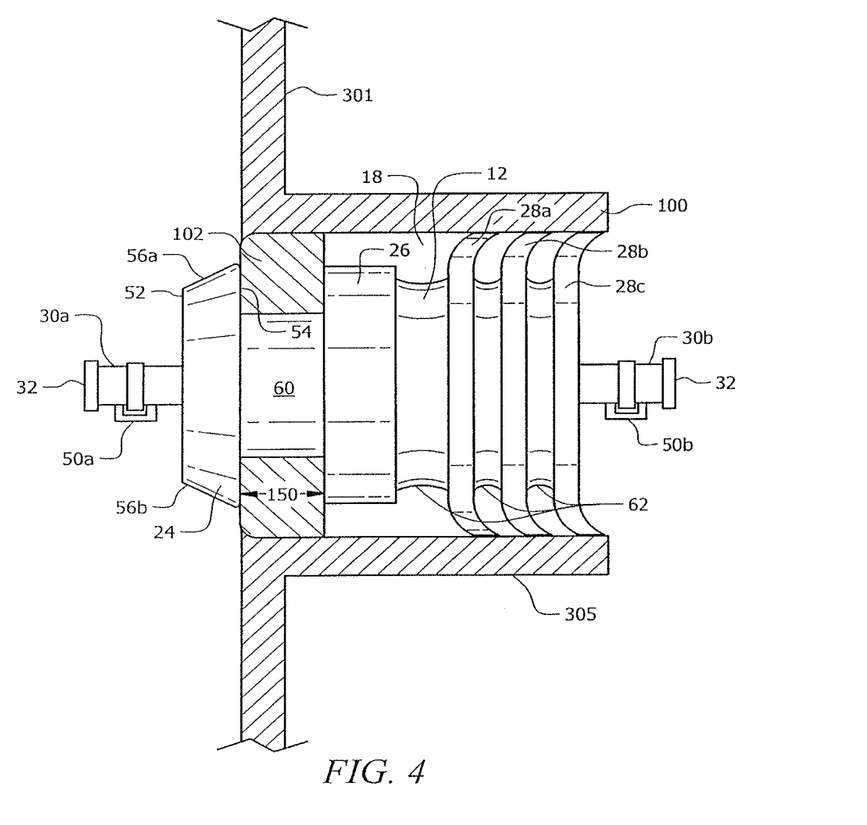
FIG. 4 illustrates the connector plug in operation with the housing.

FIG. 4 illustrates a connector plug 12 inserted into an opening 18 of housing 14 according to one embodiment of the present disclosure. In this embodiment, opening 18 has an outer frame 100 and an inner frame 102. Here, inner frame 102 has a thickness 150 that is substantially the same size as the indentation formed by barrel portion 60 between hook 24 and stopper 26 of connector plug 12. In other embodiments, inner frame thickness 150 may be the same as or smaller than the indentation formed by barrel portion 60 between hook 24 and stopper 26 of connector plug 12.

Hook 24 of connector plug 12 is inserted into opening 18 and pushed through inner frame 102. Here, the dimensions of inner frame 102 are somewhat smaller than those of hook 24. However, hook 24 is able to pass through inner frame 102 because hook 24 has a beveled surface 52 with flexible edges 56a-b that bend when force is applied against connector plug 12 being inserted into opening 18. Once hook 24 passes through inner frame 102, flat surface 54 of hook 24 latches against inner frame 102 and prevents hook 24 from easily sliding back out of opening 18. Placing hook 24 through inner frame 102 positions connector plug 12 such that first barrel portion 60 of connector plug 12 is placed within inner frame thickness 150. Because first barrel portion 60 here is the same size as thickness 150, it fills all of thickness 150. Stopper 26, which has dimensions larger than those of inner frame 102, is attached to the other end of barrel portion 60. Stopper 26 is thus positioned against inner frame 102 and prevents connector plug 12 from easily moving further forward within opening 18.

Stopper 26 is connected to ridges 28a-c by second barrel portion 62 of connector plug 12. Here, ridges 28a-c have slightly larger dimensions than outer frame 100 and bend slightly to fit inside outer frame 100. In other embodiments, ridges 28a-c may have the same sized dimensions as those of outer frame 100 of opening 18. In either embodiment, ridges 28a-c fill all of outer frame 100 to create a watertight seal in opening 18. In one embodiment, ridges 28a-c may be substantially rectangular and may have rounded corners. Outer frame 100 may also have rounded corners. In such an embodiment, the flexible rounded corners of ridges 28a-c may fold to fill the space around the rounded corners of outer frame 100 effectively. In another embodiment, ridges 28a-c may be substantially circular and outer frame 100 may also be substantially circular. Ridges 28a-c here may also be slightly larger than outer frame 100 and may bend to fit inside outer frame 100.

In the present embodiment, neck 30b is attached to ridge 28c. Here, fastener 50b, which is operable to manipulate the size of via 32, is removably coupled to neck 30b. Via 32 runs through connector plug 12 and terminates at necks 30a and 30b. To remove connector plug 12 from opening 18, a user may pull cable 16 that runs through via 32 of connector plug 12 in a direction away from opening 18. Although flat surface 54 of hook 24 prevents connector plug 12 from being accidentally or inadvertently detached from housing 14, a user who wishes to remove connector plug 12 from housing 14 may do so by pulling the cable 16 with sufficient force. Applying force on connector plug 12 in a direction away from housing 14 may cause the flexible edges of hook 24 to bend away from stopper 26 and towards neck 30a thereby detaching hook 24 from housing 14 and allowing connector plug 12 to be removed from opening 18.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants wish to note that they do not intend any of the appended claims to invoke 35 U.S.C. §112(f) as it exists on the date of filing hereof unless the words "means for" or "step for" are explicitly used in the particular claim.

What is claimed is:

1. A connector plug, comprising:
   a hook with flexible edges, the hook having a first beveled surface and a second flat surface;
   a stopper that is coupled to the flat surface of the hook by a first barrel portion of the plug;
   a plurality of ridges with flexible edges, the plurality of ridges being coupled to each other and to the stopper by a second barrel portion; and
   a via extending through the connector plug from a first end of the connector plug to a second end of the connector plug;
   wherein the connector plug is operable to be removably coupled to a housing separate from the connector plug by inserting the first beveled surface of the hook into a first end and through a second end of a corresponding opening in the housing or removed from the housing by pulling a cable fastened to the hook with sufficient force such that the second flat surface comes out of the corresponding opening.

2. The connector plug of claim 1, wherein:
   the first end of the corresponding opening of the housing comprises an outer frame that has a dimension that is smaller than a corresponding dimension of the plurality of connector plug ridges; and
   the second end of the corresponding opening of the housing comprises an inner frame that has a dimension that is smaller than a corresponding dimension of the connector plug hook.

3. The connector plug of claim 1, wherein the plurality of ridges of the connector plug are substantially rectangular and have rounded corners.

4. The connector plug of claim 1, wherein the plurality of ridges of the connector plug are substantially circular.

5. The connector plug of claim 1, further comprising a first neck member coupled to the first beveled surface at a first end of the via, the first neck member being configured to receive a first fastener operable to manipulate the size of the via.

6. The connector plug of claim 5, further comprising a second neck member coupled to one of the plurality of ridges at a second end of the via, the second neck member being configured to receive a second fastener operable to manipulate the size of the via.

7. The connector plug of claim 1, wherein the via is operable to support a cable.

8. A connector plug system comprising a connector plug and a housing separate from the connector plug, wherein:
the connector plug comprises:
a hook having flexible edges, a first beveled surface, and a second flat surface;
a stopper that is coupled to the flat surface of the hook by a first barrel portion of the plug;
a plurality of ridges with flexible edges, the plurality of ridges being coupled to each other and to the stopper by a second barrel portion; and
a via that extends through the connector plug from a first end of the connector plug to a second end of the connector plug; and
the housing comprises a body portion that has a plurality of openings formed therein, each opening having a first end and a second end;
wherein the connector plug is operable to be removably coupled to the housing by inserting the first beveled surface of the hook into a first end and through a second end of a corresponding opening in the housing or removed from the housing by pulling a cable fastened to the hook with sufficient force such that the second flat surface comes out of the corresponding opening.

9. The system of claim 8, wherein:
the first end of one of the plurality of openings in the housing comprises an outer frame having a dimension that is smaller than a corresponding dimension of the plurality of connector plug ridges; and
the second end of one of the plurality of openings comprises an inner frame having a dimension that is smaller than a corresponding dimension of the connector plug hook.

10. The system of claim 8, wherein the plurality of openings are formed completely within the body portion of the housing.

11. The system of claim 8, wherein the connector plug further comprises a first neck member coupled to the first beveled surface at a first end of the via, the first neck member being configured to receive a first fastener operable to manipulate the size of the via.

12. The system of claim 11, wherein the connector plug further comprises a second neck member coupled to one of the plurality of ridges at a second end of the via, the second neck member being configured to receive a second fastener operable to manipulate the size of the via.

13. The system of claim 8, wherein the via is operable to support a cable.

* * * * *